INVENTORS
CHARLES R. CLEMENCE
WILLIAM C. BROWN
JAMES C. BARNES
ERIC F.V. ROBINSON

BY Cushman, Darby & Cushman
ATTORNEYS

United States Patent Office 3,286,265
Patented Nov. 15, 1966

3,286,265
SCANNING REFLECTOR ON STABILIZED PLATFORM HAVING A STOWED POSITION
Charles R. Clemence, William C. Brown, James C. Barnes, and Eric F. V. Robinson, Ottawa, Ontario, Canada, assignors to National Research Council, Ottawa, Ontario, Canada, a body corporate
Filed Apr. 1, 1963, Ser. No. 269,363
Claims priority, application Canada, Nov. 12, 1962, 862,141
6 Claims. (Cl. 343—761)

This invention relates to an antenna assembly for use as part of a radar system. It is more especially suited to use with a radar system constructed to locate the positions of weapons by obtaining echoes from projectiles fired by such weapons, or alternatively for calculating points of burst of friendly projectiles observed in a similar manner. Such a radar system is described in W. C. Brown et al., U.S. Patent No. 3,182,319.

This system requires an antenna assembly that will generate a narrow radar beam (e.g. 16 mils diameter) and will scan said beam through two closely vertically superposed horizontal arcs to form upper and lower fan-shaped beams (e.g. a scan of 400 mils). A mil is equal to 360°/6400. A projectile travelling in a trajectory intersecting these beams will return echoes to the antenna for display in a manner permitting determination of the range and azimuth values of such intersections. A computer is then employed to extrapolate from these intercepts to find the point on a working plane (usually extending through the ground at the point of firing or burst) through which the trajectory passes.

The operator must be able to direct the antenna array in azimuth, in order to align the beams generally with the area in which the trajectory of interest lies. He must also be able to set the angle of sight of the antenna, that is, to set the angle which the lower beam makes with the horizontal. The angle of divergence between beams will normally be fixed at a convenient small angle (e.g. 40 mils) by the antenna structure, but may be variable, if preferred.

For military purposes, the antenna array may conveniently be mounted on the roof of a vehicle, while the remainder of the equipment may be housed inside the vehicle. In practice, the vehicle roof cannot be relied upon to supply a permanently horizontal platform. If the antenna assembly is placed on the ground or other surface, again reliance cannot be placed on such surface being sufficiently stable and horizontal. It is thus necessary to set up a platform that is artificially maintained horizontal to form a base for the antenna array, so that the true angle of sight can be measured. Achievement of this result in a manner which is automatic, reliable and accurate is the principal object of the present invention.

To this end, the invention consists of a radar antenna assembly for mounting on a generally horizontal base surface, comprising
(a) a framework,
(b) means for mounting said framework on the base surface for pivoting about a first generally horizontal axis,
(c) a first actuator extending between said framework and said surface for controlling pivotal movement of said framework about said axis,
(d) a platform,
(e) means mounting said platform on said framework for pivoting about a second generally horizontal axis perpendicular to said first axis,
(f) a second actuator extending between said platform and said framework for controlling pivotal movement of said platform about said second axis,
(g) a turntable mounted on said platform for rotation about a vertical axis,
(h) an antenna array mounted on said turntable,
(i) first level detector means sensitive to the existence and sense of any misalignment of said framework from the horizontal about said first axis,
(j) second level detector means sensitive to the existence and sense of any misalignment of said platform from the horizontal about said second axis,
(k) and levelling means responsive to signals from both said detector means to energize said actuators to restore said platform to a horizontal plane upon occurrence of any such misalignment.

A further object of the present invention is to provide reliable means, capable of ready and simple actuation by the operator, for automatically and simultaneously bringing each of the above-mentioned movements of which the antenna assembly is capable to a predetermined stowage position, when it is desired to cease operation and/or move the vehicle. In the case of the platform, the stowage position will normally be a position parallel to the vehicle roof; in the case of the turntable which is mounted on the platform for rotating the antenna array in azimuth, a position can be chosen arbitrarily as the stowage position (preferably the position affording the best road clearance conditions); in the case of angle of sight, the stowage position will normally be that in which the lower beam extends horizontally, assuming the platform to be horizontal; and in the case of the reflector, the stowage position is, of course, the lowered position.

This latter object is achieved by a radar antenna assembly for mounting on a generally horizontal base surface, comprising
(a) a framework,
(b) means for mounting said framework on the base surface for pivoting about a first generally horizontal axis,
(c) a first actuator extending between said framework and said surface for controlling pivotal movement of said framework about said axis,
(d) a platform,
(e) means mounting said platform on said framework for pivoting about a second generally horizontal axis perpendicular to said first axis,
(f) a second actuator extending between said platform about said second axis,
(g) a turntable mounted on said platform for rotation about a generally vertical axis,
(h) first position detector means sensitive to the existence and sense of any deflection of said first actuator from a predetermined position,
(i) second position detector means sensitive to the existence and sense of any deflection of said second actuator from a predetermined position,
(j) third position detector means sensitive to the existence and sense of any deviation of said turntable from a predetermined rotational position,
(k) an antenna array mounted on said turntable comprising,
  (i) a reflector,
  (ii) a scanner for projecting a radar beam towards said reflector for reflection into space,
  (iii) a frame mounting said reflector and scanner in predetermined operating relationship to each other,
  (iv) means mounting said frame on said turntable for pivoting about a third horizontal axis,
  (v) a third actuator extending between said frame and said turntable for controlling pivotal movement of said frame about said third axis, (vi) fourth position detector means sensitive to the existence and sense of any deflection of said third actuator from a predetermined position, (vii) means mounting said reflector on said frame for pivoting about a fourth horizontal axis between an erect, operating position and a lowered, stowed position, (viii) and a fourth actuator extending between said reflector and said frame for controlling pivotal movement of said reflector about said fourth axis, (ix) fifth position detector means sensitive to the existence of any deflection of said fourth actuator from a predetermined position corresponding to the lowered reflector position, (l) stowage means responsive, when activated, to signals from all said position detector means to restore all said actuators simultaneously to their respective predetermined positions, (m) and unitary switch means for activating said stowage means by a single operation.

The accompanying drawings illustrate one manner in which the invention may be carried into practice. It is to be understood that the antenna assembly specifically illustrated in the drawings and described in relation thereto is furnished by way of example of the invention only, and that the broad scope of the invention is limited only by the appended claims.

*The antenna assembly generally (FIGURES 1 to 9)*

The antenna assembly shown in FIGURES 1 to 4 is assumed to be mounted on the roof 10 of a military vehicle or other generally horizontal base surface. A framework 11 is pivotally mounted on the base surface 10 about an axis defined by pins 12 which engage depending brackets 13 on the frame 11 and upstanding bearings 14 secured to the surface 10. Control of tilting movement of frame 11 about pins 12 is exercised by an actuator A connected to a bracket 16 projecting rearwardly from the frame 11, and having its extensible element connected to a mounting 17 on the surface 10. Details of the structure of the actuator A are given below in connection with FIGURES 10 to 12. A mercury bubble switch MSA mounted on frame 11 detects the sense of any deviation from the horizontal about the axis of pins 12 in excess of a small value, for example 1½ minutes of arc. A bubble assembly comprising more than one bubble may be used if desired for increased sensitivity or lower cost.

Figure 10:
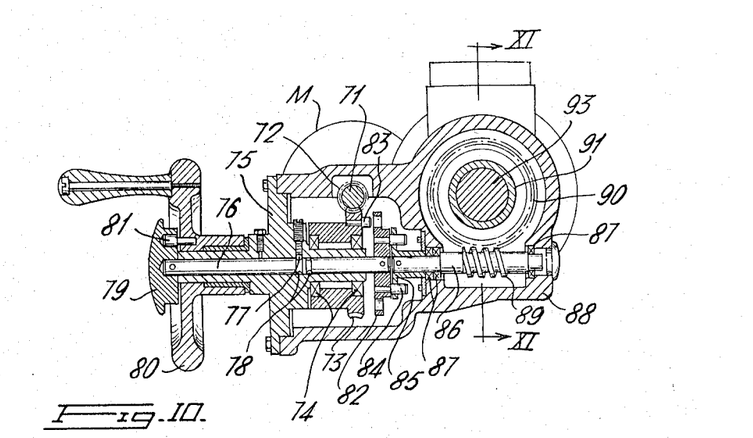
FIGURE 10 is a sectional view of an actuator.
Figures 11, 12:
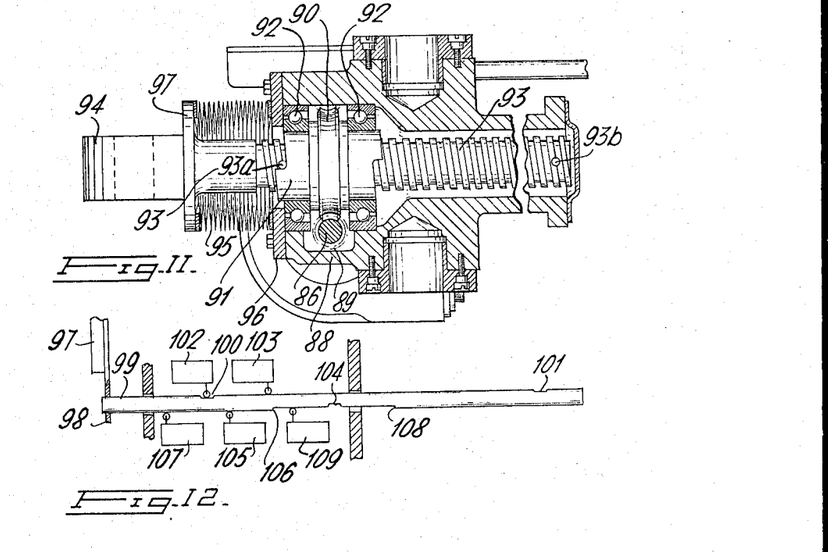
FIGURE 11 is a section on the line XI—XI in FIGURE 10.
FIGURE 12 is a fragment of the actuator of FIGURES 10 and 11.

To provide a second horizontal axis of rotation at right angles to that defined by the pins 12, a platform 20 is mounted on the frame 11 by pins 21 which engage bearings 22 projecting from the top of the frame 11 and brackets 23 depending from the platform 20. Control of tilting about pins 21 is exercised by a second actuator B similar to the actuator A. Actuator B is mounted on the frame 11, while its exentsible element engages a bracket 25 secured to the platform 20. Platform 20 carries a second mercury bubble switch MSB which will detect the sense of any deviation from the horizontal of such platform in excess of 1½ minutes of arc about the axis of pins 21. Thus, by suitable control of actuators A and B by respective mercury switches MSA and MSB in the manner later described, platform 20 can be brought to a truly horizontal position regardless of the tilt of the surface 10, within the limits of travel permitted by the gimbal-like mounting afforded by pins 12 and 21 and the full throw of each of actuators A and B.

Platform 20 carries a turntable 26 which can be rotated on the platform 20 about a central vertical axis to rotate the antenna array in azimuth. Rotation about this vertical axis is controlled by a motor 27 (or, for manual operation, by handwheel 28). Secured to the upper surface of the turntable 26 is a transverse girder 30 which, at the front edge of each of its extreme ends, is formed with an upstanding bearing 31 which supports a pin 32. Antenna support members are journalled on pins 32 which thus define a horizontal axis about which the antenna can rock to vary its angle of sight. Positioned between the pins 32 is a third pin 34 (FIGURE 5) supported by a bracket 35 secured to a scanner 42. Pin 34 secures a stay bar 36 to the scanner 42. The frame constituted by members 33, scanner 42 and other parts secured thereto is a rocking frame which can pivot about pins 32 to vary the angle of sight of the radar beams. Such movement is controlled by an actuator C (or its handwheel 38), the extensible element of the actuator C being secured by a pin 39 to the stay bar 36, while its casing is secured to the turntable 26 by a pivotal connection consisting of a pin 40 and a bracket 41.

The scanner 42 forms the front edge of the rocking frame. This scanner 42 driven by motor 43 projects a radar beam through a horn structure 44 for reflection into space as a focused beam by a semi-parabolic reflector 45. The scanner 42 causes this beam to scan back and forth horizontally in two arcs to project two fan-shaped radar beams from the reflector 45. The lower of these fan-shaped beams travels horizontally out from the reflector 45 (when the angle of sight is zero) and the upper beam makes a small angle (e.g. 40 mils) with the lower beam. When the actuator C is operated to vary the extension of its extensible element and thus tilt the antenna rocking frame, the reflector 45 and the scanner 42 are both tilted so that the angle of sight of both radar beams is varied, while the spatial relationship between the reflector 45 and the scanner 42 and between the beams is maintained constant. The range of this movement might typically be from +12° to −6° angle of sight of the lower beam in relation to the horizontal.

Figure 1:
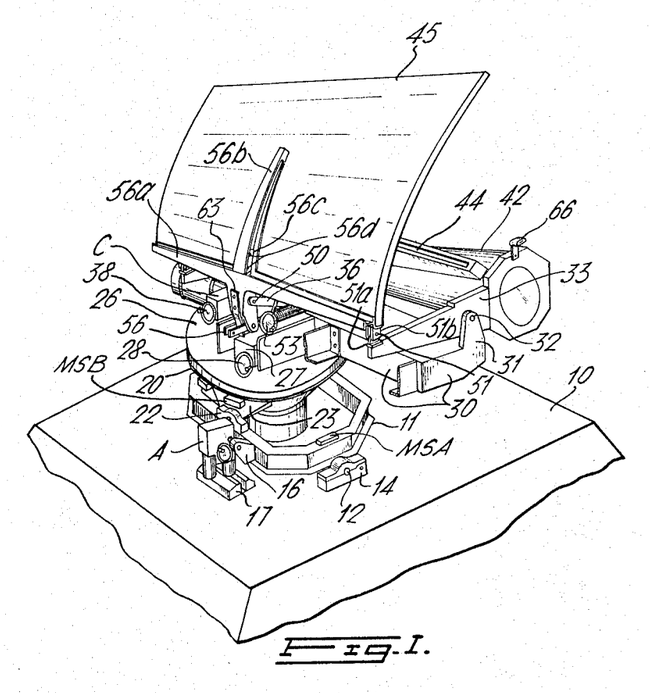
FIGURE 1 is a general perspective view of an antenna assembly.
Figure 2:
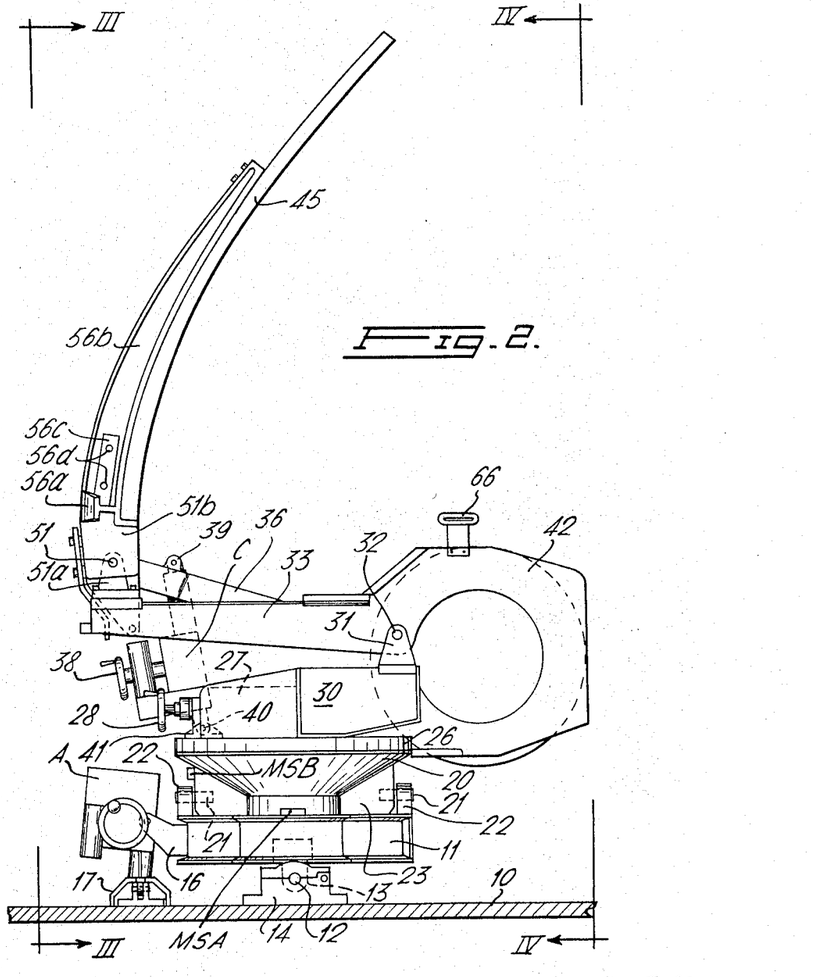
FIGURE 2 is an end view of the assembly of FIGURE 1.
Figure 3:
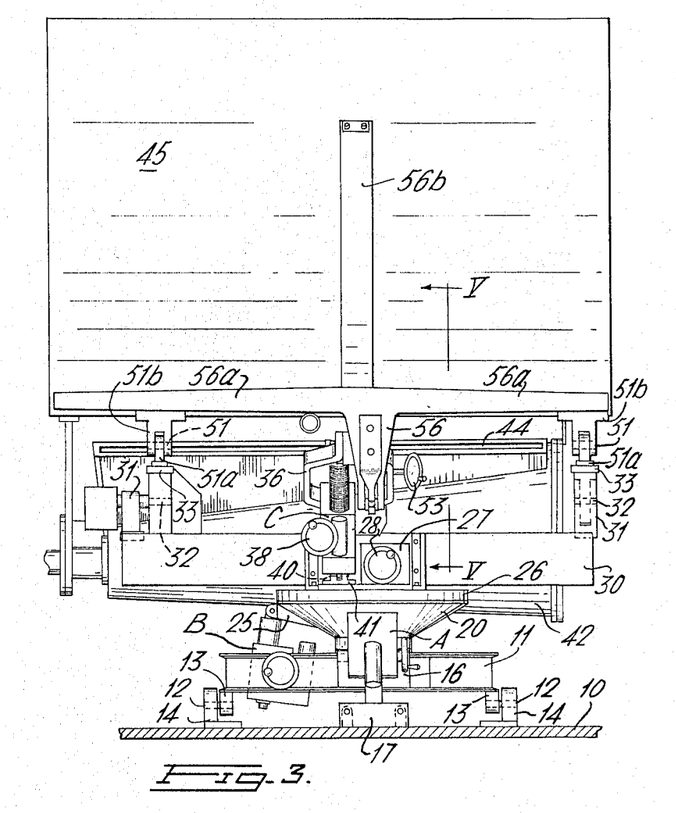
FIGURE 3 is a rear view of the assembly of FIGURES 1 and 2 seen on the line III—III in FIGURE 2.
Figure 4:
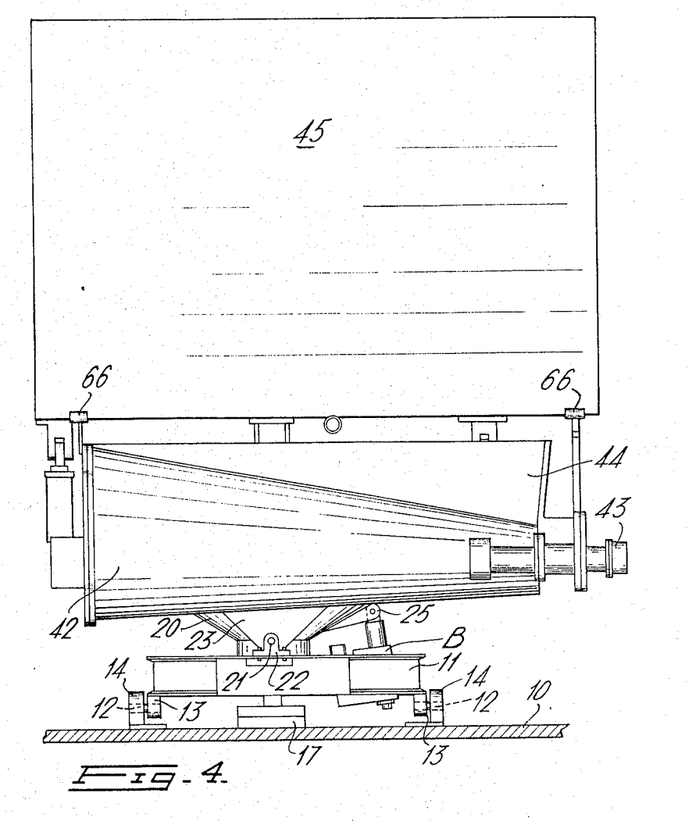
FIGURE 4 is a front view seen on the line IV—IV in FIGURE 2.
Figure 5:
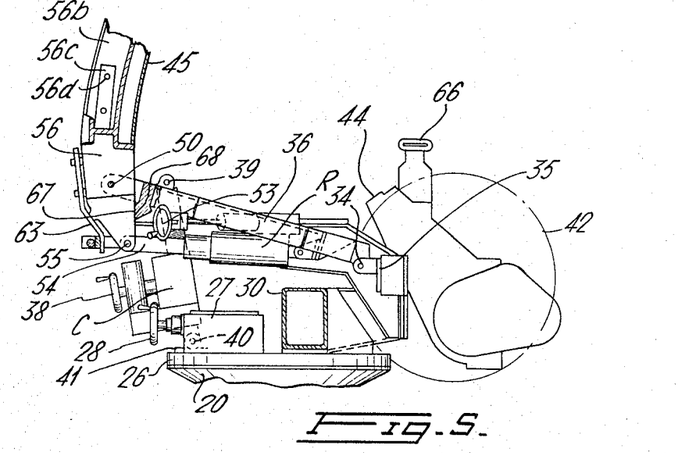
FIGURE 5 is a fragmentary view of a portion of the operating mechanism taken on the line V—V in FIGURE 3.
Figure 6:
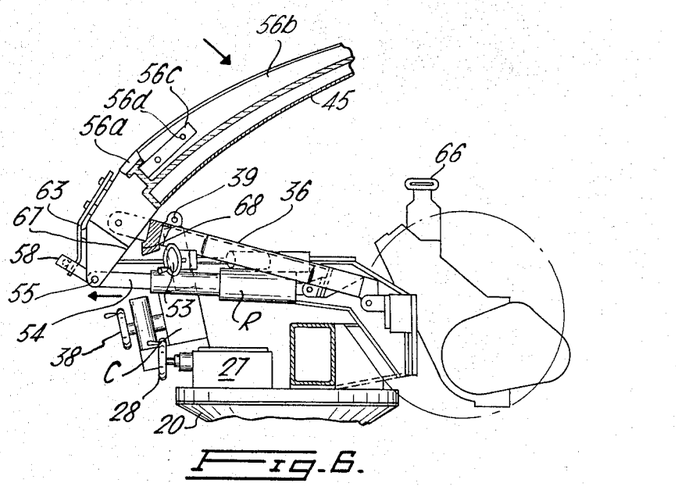
FIGURE 6 shows the same parts as FIGURE 5 in a different position.
Figure 7:
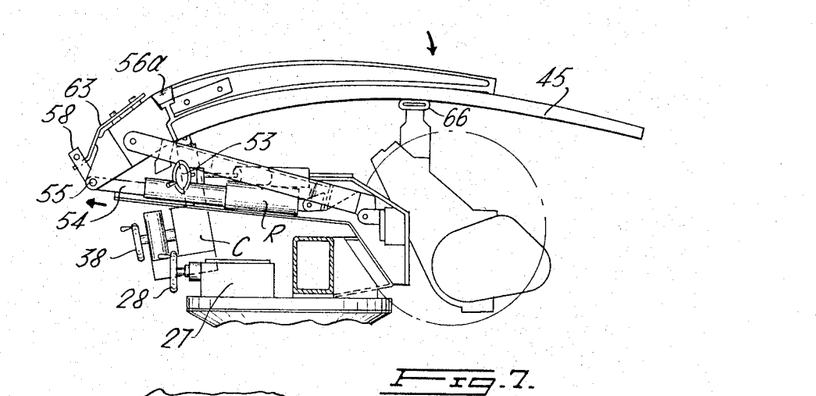
FIGURE 7 shows the same parts as FIGURES 5 and 6 in yet another position.

Yet another movement of the reflector 45 is possible for the purpose of lowering the reflector for stowage. Such stowage of the reflector 45 is demonstrated by a comparison between FIGURES 5, 6 and 7, FIGURE 5 showing the reflector 45 in its operational position, FIGURE 6 showing the reflector partly lowered and FIGURE 7 showing the reflector fully stowed. The pivotal axis of this movement is defined by a pin 50 supported in the end of stay bar 36, and, coaxially therewith, pins 51 supported on bearings 51a mounted on frame members 33 at each end of the assembly. Pin 50 engages a double bracket 56 which projects downwardly from the centre of a beam 56a extending along the bottom rear edge of the reflector 45 enhancing the rigidity of such reflector and carrying bearings 51b. The stowage motion is controlled by a power operated actuator R incorporating a manually operable wheel 53. The movable element 54 of the actuator R is pivotally connected to the reflector 45 by a pin 55 which extends through the extreme lower end of the bracket 56. A further bracing strut 56b secured to beam 56a by plate 56c and bolts 56d extends for the greater portion of the distance up along the back surface of reflector 45.

Figures 8, 9:
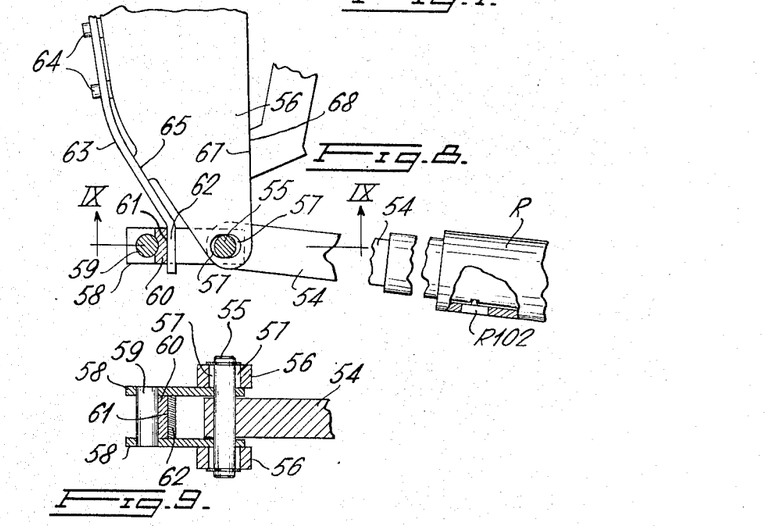
FIGURE 8 shows an enlarged fragmentary view of a portion of FIGURE 5.
FIGURE 9 is an underside view taken on IX—IX in FIGURE 8.

As best seen from FIGURES 8 and 9, pin 55 seats in slightly elongated holes 57 in the bracket 56 while tightly engaging a pair of plates 58 joined together by a pin 59. A block 60 secured to the pin 59 presents a flat face 61 for engagement with an end portion 62 of a strong leaf spring 63 secured to the bracket 56 by bolts 64 so as to bear with a central portion against a raised surface 65 of such bracket. When the movable element 54 of actuator R is extended, it rotates the members 56, 56a and 56b and hence the reflector 45 about pins 50, 51, moving through the semi-stowed position shown in FIGURE 6, until the stowed position shown in FIGURE 7 is reached with the reflector surface resting on padded supports 66. When the reflector 45 is to be re-elevated into its erect, operating position, the actuator R is contracted to withdraw its movable element 54. As the parts move into the erect position, abutment surface 67 on the bracket 56 (FIGURES 5, 6 and 8) comes to bear against a fixed stop 68 formed on the stay bar 36. The actuator R is energised to continue to withdraw its movable element 54 slightly beyond this position, such further movement being absorbed by travel of the pin 55 within the elongated holes 57 with deflection of spring 63 about surface 65. As the pin 55 moves towards the ends of the elongated holes 57 remote from the spring 63 further movement is stopped by a limit switch R102 which is shown diagrammatically in FIGURE 8 and described in more detail below. FIGURE 8 shows the position of the parts at this moment. When the reflector is in the lowered position, or at any intermediate position, pin 55 will bear against the left hand ends of holes 57 (that is, left hand as seen in FIGURES 8 and 9) and the spring 63 will have little or no bending stress applied to it.

In the erect position, the additional force exerted by the spring 63 on the surface 65 acts to hold the abutting surface 67 and stop 68 in very firm contact with each other, even when the reflector 45 is subjected to substantial forces resulting from wind loads. Wind bearing against the front of the reflector 45 will tend to press surface 67 and stop 68 even harder into contact with each other, but wind bearing against the rear of the reflector 45 will have the reverse effect and would tend to separate these parts if it were not for the force exerted by spring 63. Sufficient resistance to any separating movement is provided by the stressed spring 63 for all wind velocities likely to be encountered in practical operation.

*The actuator structure (FIGURES 10 to 12)*

A typical actuator for use as actuator A or B, or with dimensional modifications actuator C or R, is shown in FIGURES 10 to 12. This actuator consists of motor M (FIGURE 10) the shaft 71 of which carries a worm 72 meshing with a worm wheel 72 which is mounted by bearings 74 to be free to turn on casing part 75. A second shaft 76 is freely rotatable within casing part 75, and is slidable therein between two positions defined by ball 77 cooperating with grooves 78, under manual control from knob 79. In the position shown in FIGURE 10, the shaft 76 is engaged with a handwheel 80 by means of a pin 81 projecting from the handwheel 80 to enter a hole in the control knob 79. When knob 79 is pulled outwardly, it disengages from the pin 81, while causing an apertured clutch plate 82 on the inner end of the shaft 76 to engage a pin 83 projecting from worm wheel 73. In this manner shaft 76 is changed over from manual to motor operation.

Clutch plate 82 also carries pins 84 which slidingly and permanently engage slots in a further plate 85 mounted on a third shaft 86 forming a coaxial extension of shaft 76 and supported by bearings 87 in casing part 88. Shaft 86 carries a worm 89 meshing with worm wheel 90 which, as best seen in FIGURE 11, is mounted on a sleeve 91 supported in casing part 88 by bearings 92 to turn freely while being prevented from moving axially. Sleeve 91 is threaded on its inner surface to engage a threaded rod 93 which constitutes the extensible element of the actuator and carries at its projecting end a block 94 for fixing to the parts that are to be moved a controlled amount relative to the actuator casing. The casing enclosure is completed by an extensible bellows 95 extending between casing part 96 and a plate 97 secured to the extensible rod 93. The mechanical limits of travel of rod 93 are determined by stop pins 93a and 93b.

Secured to plate 97 by arm 98 (FIGURE 12) is a rod 99 slidingly mounted in the casing. Rod 99 has a first pair of recesses 100 and 101 cooperating respectively with the actuators of micro switches 102 and 103. Actuation of switch 102 by recess 100 in the position shown signals that the mechanism is at one end of its travel (fully withdrawn), while actuation of switch 103 by recess 101 at the other end of rod 99 signals that the mechanism is at the other end of its travel (fully extended). When a recess 104 is aligned with the actuator of micro switch 105, the latter signals that the mechanism is in the desired stowage position intermediate but not necessarily mid-way between the two extremes. When the mechanism is in this stowage position the shoulder 106 is just beyond (leftward) the actuator of return switch 107, and shoulder 108 is just beyond (rightward) the actuator of return switch 109. Whenever the rod 99 moves away from the stowage position, the direction of this movement is indicated by whichever of switches 107, 109 is actuated.

The angle of sight actuator C will be essentially the same as, and will operate similarly to, levelling actuators A and B shown in FIGURES 10 to 12. Similarly the actuator R for reflector positioning will be essentially the same, except that, in this case, only the switches 102, 103 that indicate the extreme positions of travel are used.

*The control circuits (FIGURES 13 to 16)*

Figure 13:
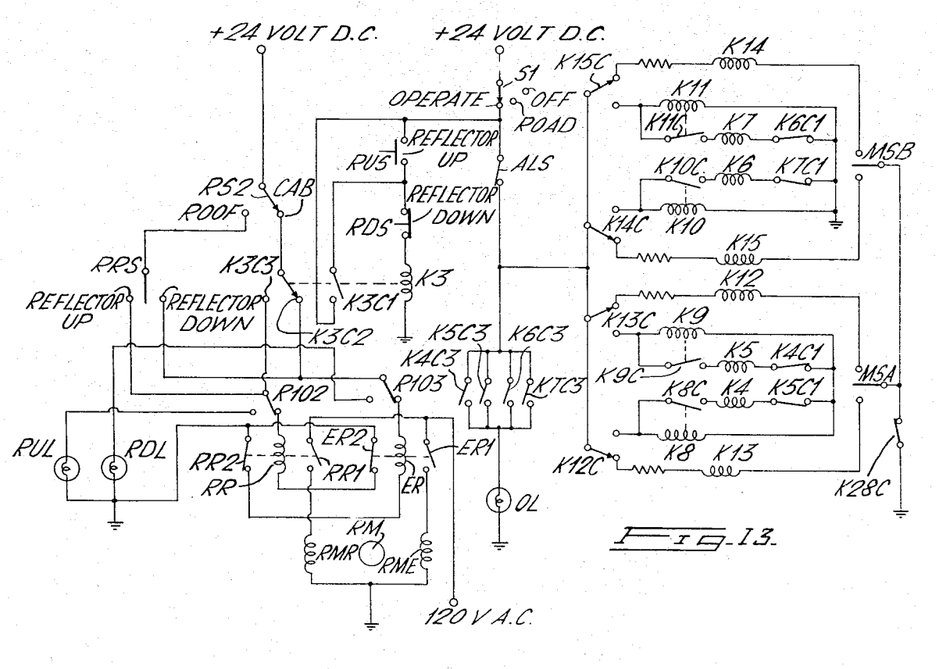
FIGURE 13 to 16 show circuits controlling levelling and stowage of the antenna.

The levelling control circuit containing mercury switches MSA, MSB is shown in FIGURE 13. Let it be assumed that mercury switch MSA moves to its upper position to signal REAR DOWN, that is to say that the rear of frame 11 and hence of platform 20 is too low.

Figure 14:
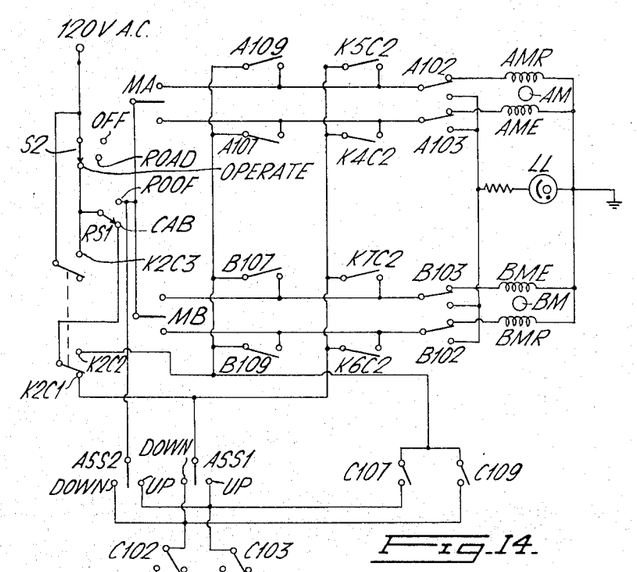

A main operator's switch S having three positions, OFF, ROAD and OPERATE has a number of ganged sections S1 to S6, of which sections S1 and S2 are shown in FIGURES 13 and 14 respectively. With switch section S1 in the OPERATE position and an auto-level switch ALS closed, the upward movement of mercury switch MSA energizes a relay K8 to close its contacts K8C and energize relay K4. Relay K4 has a first pair of contacts K4C1 that become opened, and a second pair of contacts K4C2 (FIGURE 14) that became closed. The latter contacts complete a circuit through a second section S2 of switch S (in OPERATE position), a first section RS1 of a roof switch, a pair of contacts K2C1 of an auto-return relay K2 (FIGURE 15), and limit switch A103 of actuator A (switch 103 of FIGURE 12) to an extend winding AME of the motor AM of actuator A. The extensible element of actuator A is thus extended to raise the rear of frame 11 and correct the deviation from the horizontal that mercury switch MSA (FIGURE 13) detected.

Had mercury switch MSA moved down to a signal a FRONT DOWN condition, relay K13 would have been energized to change over contacts K13C, energise relay K9, close contacts K9C, energise relay K5, open contacts K5C1 and close contacts K5C2 (FIGURE 14) to energise the retract winding AMR of motor AM of actuator A, again to correct the deviation.

In a like manner, mercury switch MSB (FIGURE 13) corrects for right and left tilt. If a RIGHT DOWN condition arises, mercury switch MSB is raised to energise relay K14 to change over contacts K14C, energise relay K10, close contacts K10C, energise relay K6, open contacts K6C1 and close contacts K6C2 (FIGURE 14) to energise the retract winding BMR of motor BM of actuator B to lower the left hand side of platform 20, as best visualized from FIGURE 3. Similarly lowering of mercury switch MSB (FIGURE 13) energises relay K15 to change over contacts K15C, energise relay K11, close contacts K11C, energise relay K7, open contacts K7C1 and close contacts K7C2 (FIGURE 14) to energise the extend winding BME of motor BM.

Because the electric current through mercury switches MSA and MSB (FIGURE 13) must be severely limited in order to preserve their accuracy, low current relays K12, K13, K14 and K15 have been introduced between the mercury switches and the power relays K8, K9, K10 and K11.

Each of windings AMR, AME, BMR, BME is protected by a respective limit switch A102, A103, B102, B103 which opens when the actuator has completed full travel in the direction in which it is being driven by the energised winding. A level limit lamp LL is lit by the actuated limit switch to signal the operator that the apparatus has reached one extreme of its adjustment capabilities and that he cannot rely on the antenna platform 20 being horizontal. Contacts K4C3 to K7C3 (FIGURE 13) of relays K4 to K7 respectively are connected in parallel to energise an off level lamp OL whenever one of the motor windings is energised to indicate that the system is in the process of correcting the level of antenna platform 20.

Should any person climb onto the vehicle roof 10 for maintenance or other purposes, he may first throw the roof switch from CAB to ROOF position, thus by section RS1 (FIGURE 14) disconnecting the automatically controlled contacts K4C2 to K7C2 from power supply and preventing automatic levelling operation from taking place. Manually operable switches MA and MB situated at a convenient location on the vehicle roof then control the motors AM and BM as before.

The achievement of an accurately horizontal platform 20 for operation of the radar antenna will be possible only with the vehicle stationary. Indeed, it is intended that the radar system function only when the vehicle is stationary. Nevertheless, even with the vehicle stationary, a continuous automatic monitoring of the level of platform 20 is necessary, as the wheels or tracks of a heavy stationary vehicle can sink appreciably into soft ground in a comparatively short time.

When it is desired to move the vehicle, it is necessary to stow the antenna. As a preliminary to the stowing operation, the platform 20 must be readjusted, this time in relation to the vehicle roof or other base surface 10 rather than the horizontal. The correct relationship between platform 20 and vehicle roof is represented by the stowage positions of actuators A and B, so that any deviation one way or the other from the stowage positions of the platform 20 will be indicated by return switch 107 or 109, as the case may be (FIGURE 12). These return switches for each actuator appear as switches A107, A109, B107, B109 in FIGURE 14.

Before moving the vehicle the operator moves his main switch to ROAD thus de-energising the entire automatic levelling control circuit by switch section S1 (FIGURE 13). At the same time, section S3 of this switch (FIGURE 15) completes a circuit through any one of parallel connected, stowed switches A105, B105, C105 and R103A and an auto-return switch ARS to energise auto-return relay K2. Relay K2 opens its contacts K2C1 (FIGURE 14) and closes its contacts K2C2 and K2C3. Contacts K2C3 short out switch section S2 and, assuming the roof switch section RS1 is in CAB position, supply power through contacts K2C2 to whichever of return switches A107, A109, B107, B109 is closed. In this way motors AM and BM are turned until both achieve their stowed positions, when all four return switches are opened and further movement ceases. Stowed switches A105 and B105 are also opened when the motors achieve their stowed positions.

When the main switch is at OPERATE, the reflector can be raised and lowered at will. This is accomplished by reflector-down push button switch RDS (FIGURE 13) which, on actuation, de-energises relay K3 which has previously been held energised by holding contacts K3C1. Contacts K3C2 then close to complete a circuit from a second section RS2 of the roof switch (in the CAB position) to energise an extend relay ER, contacts ER1 of which then close to energise the extend winding RME of the motor RM of reflector actuator R to expand the same and lower the reflector 45 to its stowed position. When the reflector reaches the stowed position, a stowed limit switch R103 (FIGURE 13) de-energises extend relay ER to halt downward movement of the reflector. At the same position the stowed limit switch R103A (FIGURE 15) opens.

When relay K3 is re-energised by reflector-up push button switch RUS, contacts K3C1 are closed to hold the relay K3, while contacts K3C3 are closed to energize a retract relay RR, contacts RR1 of which close to energise a retract winding RMR of the reflector motor RM to retract the actuator R and raise the reflector 45 towards its erect position. When the fully erect position is reached, the up-limit switch R102 (FIGURES 8 and 13) de-energises relay RR to halt movement of the reflector. The circuits of the extend and retract relays ER and RR respectively include contacts RR2 and ER2 which prevent both relays being operated simultaneously. Limit switches R103 and R102, when operated, energise reflector-down lamp RDL or reflector-up lamp RUL respectively.

When the main switch is moved to ROAD or OFF, switch section S1 de-energises relay K3 so that lowering of the reflector follows automatically in the manner just described. However, if the roof switch section RS2 is moved to ROOF position at any time (regardless of the position of the main switch), the reflector position can only be changed by roof reflector switch RRS mounted on the vehicle roof which energises relays RR and ER in the manner already described.

Further indicating lamps, testing circuits, motor brakes and other safety interlocks will be provided as required in practice. These have not been illustrated, as they are conventional in nature.

Control over the angle of sight of the antenna is normally exercised by the operator through an angle of sight switch ASS1 (FIGURE 14) which is of the type normally held in central position by spring pressure. When the operator wishes to raise or lower the angle of sight, he holds the switch ASS1 at one extreme or the other, only releasing it when the required angle has been achieved. Switch ASS1 is connected to 120 volts A.C., whenever switch section S2 is in OPERATE position and the roof switch section RS1 is in CAB position. When the roof switch is in ROOF position, a second, similarly operating angle of sight switch ASS2 mounted on the vehicle roof is connected instead to the power supply (regardless of the position of the main switch).

When moved to their respective extreme positions, either of switches ASS1 and ASS2 controls respective extend and retract windings CME and CMR of motor CM of actuator C. Limit switches C102 and C103 prevent any attempt to drive the motor CM beyond the actuator's travel limits. Either limit switch will light an angle of sight limit lamp ASL.

If the main switch is moved to the ROAD position thus energising auto-return relay K2 (FIGURE 15) and the roof switch RS is at CAB, power is applied through contacts K2C2 to return switches C107 and C109 which act in an analogous way to that of the corresponding switches of actuators A and B, that is to move the angle of sight actuator C to a stowed position intermediate between its extreme positions. When it reaches the stowed position, the stowed switch C105 (FIGURE 15) opens.

Figure 15:
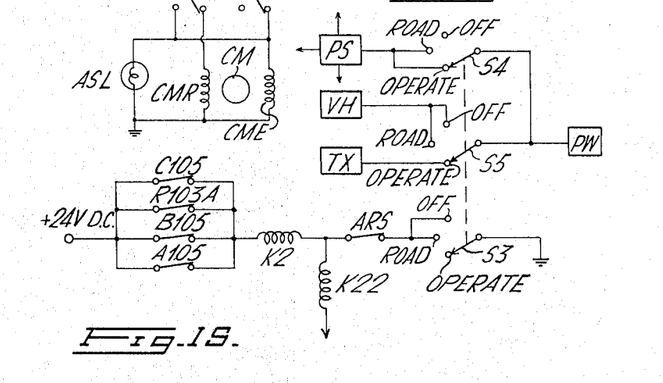

When the stowed switches A105, B105, C105 and R103A are all open, indicating that the levelling, the angle of sight and the reflector are all in the stowed position, relay K2 releases.

Figure 16:
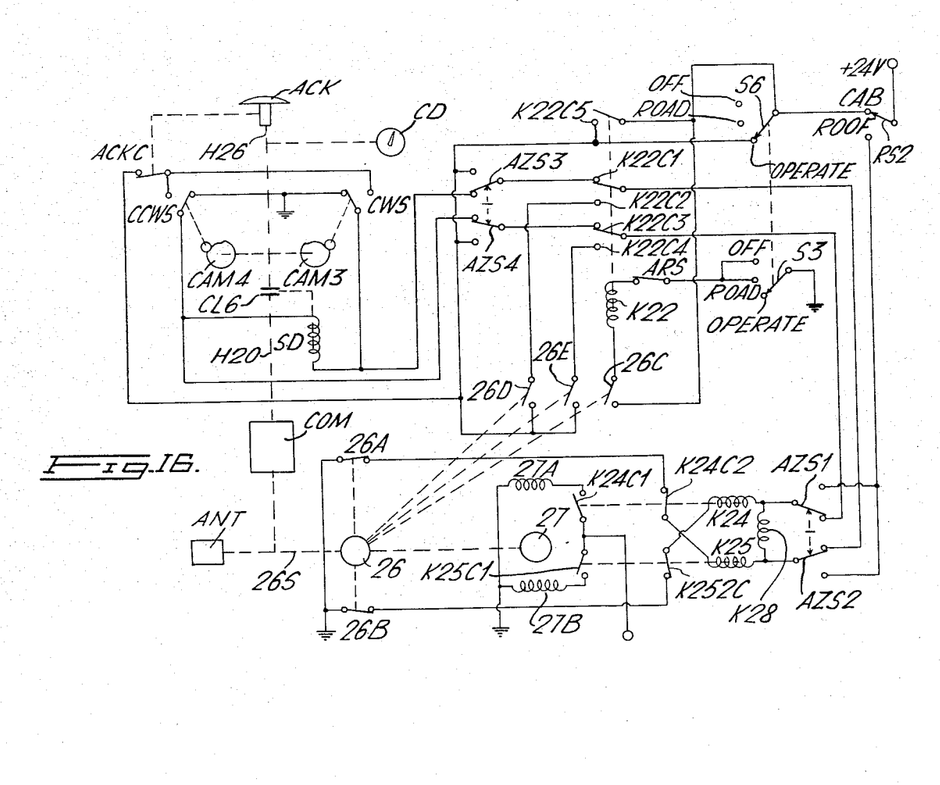

The control circuit for azimuth slewing is shown in FIGURE 16. Motor 27 can be driven in either direction depending on the winding 27A or 27B energised by contacts K24C1 or K25C1 of relays K24 and K25 respectively. These relays K24, K25 are energised to close their motor-controlling contacts through normally closed contacts K25C2 and K24C2 to prevent both relays being energised simultaneously, through limit switches 26A and 26B operated at respective ends of the azimuth travel of the turntable 26, and through a pair of ganged azimuth-slew switches AZS1 and AZS2 situated on the vehicle roof. When the roof switch section RS2 is in ROOF position movement of the azimuth-slew switches AZS1 and AZS2 in either direction from the central position shown will cause the motor 27 to turn correspondingly. Normally, these switches are held by spring pressure in the central position shown, where they connect the relays K24, K25 to the contacts of a further relay K22. With the main switch section S3 in the OPERATE position shown, relay K22 is de-energised, and relays K24, K25 are connected through normally closed contacts K22C1 and K22C3 to another ganged pair of azimuth-slew switches AZS3 and AZS4 situated in the cab of the vehicle. With switch section RS2 in CAB position and main switch section S6 at operate, movement of switches AZS3 and AZS4 in either direction will drive motor 27 correspondingly.

The circuit of FIGURE 16 incorporates two separate automatic azimuth control systems. The first operates whenever the main switch is moved to ROAD or OFF for automatic stowage of the antenna equipment. For this purpose, switch section S3 energises relay K22 through auto-return switch ARS and cam-operated contacts 26C of the turntable 26 controlled by motor 27. Contacts 26C will be closed in all positions of the turntable 26 except the position required for stowage. With relay K22 thus energised and contacts K22C2 and K22C4 connected to the motor controlling relays K24 and K25 cam-operated contacts 26D and 26E energised through contacts K22C5 determine which of these relays (K24, K25) is energised.

Contacts 26D and 26E are controlled by turntable 26, one being closed whenever the turntable is on one side of the stowed position, and the other being closed whenever the turntable is on the other side of the stowed position. In this way the turntable is brought back to its stowed position, as soon as the main switch is moved to ROAD or OFF, provided the roof switch has not been moved to the ROOF position. Contacts 26C open when the turntable has reached the stowed position, releasing relay K22.

The second automatic azimuth control system is provided to rotate the antenna to permit targets that appear at the edge of the radar screen to be moved towards the centre, and functions only when the main switch is in OPERATE. Under this condition relay K22 is de-energised. Azimuth-slew switches AZS3 and AZS4 normally connect the relays K24 and K25 to cam-controlled contacts CCWS and CWS. The operator will depress and turn a knob ACK by an amount sufficient to insert desired correction to the antenna azimuth. Depression and turning of knob ACK drives a shaft H26 on which cams CAM3 and CAM4 are mounted. A centering dial CD is also mounted on shaft H26. Cams CAM 3 and CAM 4 control switches CWS and CCWS respectively (for clockwise and counterclockwise rotation of the antenna azimuth motor 27). During a setting operation, depressed knob ACK holds open a pair of contacts ACKC. As soon as the knob ACK is released, contacts ACKC close, and, depending on the sense in which the setting was made, one or other of switches CCWS, CWS energises a respective relay K24 or K25. The switch CCWS or CWS not so operated is grounded. Thus, whenever one of these switches is operated, a solenoid SD is energised to engage a clutch CL6 to connect shaft H26 to a shaft H20. As illustrated in FIGURE 11 of the prior application referred to above, shaft H20 is coupled through a computer (shown in the present FIGURE 16 merely as a block COM) to the antenna ANT. In present FIGURE 16 this antenna shaft is shown as the shaft 26S of the turntable 26. When the turntable 26 and hence the antenna ANT has taken up the new position set by the knob ACK, the switch CWS or CCWS that was operated will be returned to the unoperated position shown in FIGURE 16.

Whenever the turntable 26 is rotated by energisation of one or other of relays K24, K25, a relay K28 is energised to open its contacts K28C (FIGURE 13) in the circuit to mercury switches MSA and MSB. In this way the levelling circuit of FIGURE 13 is temporarily rendered inoperative during slewing of the antenna to a new azimuth position, in order to avoid spurious signals energising the levelling circuit. As soon as the new azimuth position is achieved, relay K28 is de-energised to close its contacts K28C so that the levelling circuit can continue to function normally.

Section S4 of the main switch (FIGURE 15) illustrates the difference between the ROAD and OFF positions of this switch. In the ROAD and OPERATE positions, the power source PW is connected to the power supply PS from which the various voltages are supplied to the other circuits. In the OFF position this connection is broken.

Section S5 of the main switch illustrates that in the OPERATE position the power source PW is connected to the radar transmitter TX, while in the ROAD and OFF positions the power source PW is connected to the vehicle ignition VH. This provision may be overridden for emergency operation of the vehicle.

Summary of operation

The main operating features of the apparatus described may be summarised as follows:

OPERATE condition (1) With the main switch at OPERATE and the roof switch (RS1 and RS2) at CAB, the mercury switches MSA, MSB continually correct for any misalignment between the platform 20 and the horizontal. Off level lamp OL (FIGURE 13) will light whenever a correction is taking place.

(2) Should one of the actuators A or B reach a limit of its throw, further driving of the actuator in the same direction is prevented and level limit lamp LL (FIGURE 14) lights to warn the operator.

(3) The operator has manual control over the angle of sight of the antenna by switch ASS1 (FIGURE 14).

(4) The operator has control over the azimuth position of the antenna by switches AZS3 and AZS4 or by knob ACK (FIGURE 16). While the antenna is moving in azimuth, the levelling control is inoperative (contacts K28C—FIGURE 13).

(5) The reflector may be raised or lowered by the operator using manual switches RUS and RDS (FIGURE 13).

(6) The power supplies are all energised (FIGURE 15).

(7) The vehicle ignition is inoperative.

ROAD condition (8) If the main switch is moved to ROAD (with the roof switch still at CAB), the platform 20 is automatically moved to its stowed position, that is to a position related to the vehicle roof or other base surface 10, instead of being mantained in a position level with respect to the horizontal. This result is achieved by the return switches A107, A109, B107, B109 (FIGURE 14) of actuators A and B.

(9) Simultaneously the angle of sight is automatically brought to a predetermined stowed position by switches C107 and C109 of actuator C (FIGURE 14).

(10) Simultaneously the reflector is automatically lowered to its stowed position by actuator R, consequent upon de-energisation of relay K3 (FIGURE 13).

(11) Simultaneously the antenna is automatically rotated in azimuth to a predetermined stowed position (for example, with the reflector axis transverse to the vehicle centreline) by contacts 26D and 26E.

(12) When all these stowed positions have been achieved, so that all of contacts A105, B105, C105, R103A (FIGURE 15) and 26C (FIGURE 16) are open, relays K2 and K22 become de-energised to remove power from the various controlling circuits.

(13) All the operator's manual controls are overridden while the main switch is in this position, the roof switch remaining at CAB.

OFF condition (14) When the main switch is moved to the OFF position, either from the OPERATE or ROAD position all the functions of paragraphs 8 to 13 are completed and all radar power supplies are de-energised.

ROOF condition (15) When the roof switch is moved to ROOF position, regardless of the position of the main switch, all the above-mentioned operating and stowage controls and switches, other than those on the antenna structure, are rendered inoperative.

(16) When the roof switch is in ROOF position, and providing the power source PW is operating,
 (a) angle of sight is controlled by antenna-mounted manual switch ASS2 (FIGURE 14);
 (b) reflector position is controlled by antenna-mounted manual switch RRS (FIGURE 13);
 (c) azimuth position is controlled by antenna-mounted manual switches AZS1 and AZS2 (FIGURE 16); and
 (d) platform level is controlled by antenna-mounted manual switches MA and MB (FIGURE 14).

We claim:

1. A radar antenna assembly for mounting on a generally horizontal base surface, comprising
 (a) a framework,
 (b) means for mounting said framework on the base surface for pivoting about a first generally horizontal axis,
 (c) a first actuator extending between said framework and said surface for controlling pivotal movement of said framework about said axis,
 (d) a platform,
 (e) means mounting said platform on said framework for pivoting about a second generally horizontal axis perpendicular to said first axis,
 (f) a second actuator extending between said platform and said framework for controlling pivotal movement of said platform about said second axis,
 (g) a turntable mounted on said platform for rotation about a vertical axis,
 (h) an antenna array mounted on said turntable,
 (i) first level detector means sensitive to the existence and sense of any misalignment of said framework from the horizontal about said first axis,
 (j) second level detector means sensitive to the existence and sense of any misalignment of said platform from the horizontal about said second axis,
 (k) levelling means responsive to signals from both said detector means to energise said actuators to restore said platform to a horizontal plane upon occurrence of any such misalignment,
 (l) first position detector means sensitive to the existence and sense of any deflection of said first actuator from a predetermined position,
 (m) second position detector means sensitive to the existence and sense of any deflection of said second actuator from a predetermined position,
 (n) stowage means responsive to signals from both said position detector means to restore both said actuators to their predetermined positions,
 (o) and switch means for choosing between said levelling means and said stowage means and for activating only the chosen means.

2. A radar antenna assembly according to claim 1, including
 (a) third position detector means sensitive to the existence and sense of any deviation of said turntable from a predetermined rotational position,
 (b) said stowage means being further responsive to signals from said third position detector means to restore said turntable to its said predetermined position on activation of said stowage means by said switch means.

3. A radar antenna assembly according to claim 2, wherein said antenna array includes
 (a) a reflector,
 (b) a scanner for projecting a radar beam towards said reflector for reflection into space,
 (c) a frame mounting said reflector and scanner in predetermined operating relationship to each other,
 (d) means mounting said frame on said turntable for pivoting about a third horizontal axis,
 (e) a third actuator extending between said frame and said turntable for controlling pivotal movement of said frame about said third axis,
 (f) and fourth position detector means sensitive to the existence and sense of any deflection of said third actuator from a predetermined position,
 (g) said stowage means being further responsive to signals from said fourth position detector means to restore said third actuator to its predetermined position on activation of said stowage means by said switch means.

4. A radar antenna assembly according to claim 3 including
 (a) means mounting said reflector on said frame for pivoting about a fourth horizontal axis between an erect, operating position and a lowered, stowed position,
 (b) and a fourth actuator extending between said reflector and said frame for controlling pivotal movement of said reflector about said fourth axis,
 (c) said stowage means being effective on activation by said switch means to energise said fourth actuator to lower said reflector to its stowed position.

5. A radar antenna assembly for mounting on a generally horizontal base surface, comprising
 (a) a framework,
 (b) means for mounting said framework on the base surface for pivoting about a first generally horizontal axis,
 (c) a first actuator extending between said framework and said surface for controlling pivotal movement of said framework about said axis,
 (d) a platform,
 (e) means mounting said platform on said framework for pivoting about a second generally horizontal axis perpendicular to said first axis,
 (f) a second actuator extending between said platform and said framework for controlling pivotal movement of said platform about said second axis, (g) a turntable mounted on said platform for rotation about a vertical axis, (h) an antenna array mounted on said turntable.

(i) first level detector means sensitive to the existence and sense of any misalignment of said framework from a horizontal about said first axis, (j) second level detector means sensitive to the existence and sense of any misalignment of said platform from the horizontal about said second axis, (k) and levelling means responsive to signals from both said detector means to energise said actuators to restore said platform to a horizontal plane upon occurrence of any such misalignment, (l) wherein said antenna array includes
  (i) a reflector,
  (ii) a frame,
  (iii) means mounting said reflector on said frame for pivoting about a further horizontal axis between an erect, operating position and a lowered, stowed position,
  (iv) a further actuator extending between said reflector and said frame for controlling pivotal movement of said reflector about said further axis,
  (v) stowage means effective on activation to energise said further actuator to lower said reflector to its stowed position,
  (vi) and switch means for activating said stowage means.

6. A radar antenna assembly for mounting on a generally horizontal base surface, comprising
  (a) a framework,
  (b) means for mounting said framework on the base surface for pivoting about a first generally horizontal axis,
  (c) a first actuator extending between said framework and said surface for controlling pivotal movement of said framework about said axis,
  (d) a platform,
  (e) means mounting said platform on said framework for pivoting about a second generally horizontal axis perpendicular to said first axis,
  (f) a second actuator extending between said platform and said framework for controlling pivotal movement of said platform about said second axis,
  (g) a turntable mounted on said platform for rotation about a generally vertical axis,
  (h) first position detector means sensitive to the existence and sense of any deflection of said first actuator from a predetermined position,
  (i) second position detector means sensitive to the existence and sense of any deflection of said second actuator from a predetermined position,
  (j) third position detector means sensitive to the existence and sense of any deviation of said turntable from a predetermined rotational position,
  (k) an antenna array mounted on said turntable comprising,
    (i) a reflector,
    (ii) a scanner for projecting a radar beam towards said reflector for reflection into space,
    (iii) a frame mounting said reflector and scanner in predetermined operating relationship to each other,
    (iv) means mounting said frame on said turntable for pivoting about a third horizontal axis,
    (v) a third actuator extending between said frame and said turntable for controlling pivotal movement of said frame about said third axis,
    (vi) fourth position detector means sensitive to the existence and sense of any deflection of said third actuator from a predetermined position,
    (vii) means mounting said reflector on said frame for pivoting about a fourth horizontal axis between an erect, operating position and a lowered, stowed position,
    (viii) and a fourth actuator extending between said reflector and said frame for controlling pivotal movement of said reflector about said fourth axis,
    (ix) fifth position detector means sensitive to the existence of any deflection of said fourth actuator from a predetermined position corresponding to the lowered reflector position,
  (l) stowage means responsive, when activated, to signals from all said position detector means to restore all said actuators simultaneously to their respective predetermined positions,
  (m) and unitary switch means for activating said stowage means by a single operation.

References Cited by the Examiner
UNITED STATES PATENTS

| | | | |
|---|---|---|---|
| 2,258,186 | 4/1941 | McNary et al. | 343—765 X |
| 2,451,793 | 10/1948 | Alexanderson et al. | 343—765 X |
| 2,475,746 | 7/1949 | Kenyon | 343—765 X |
| 2,604,698 | 7/1952 | Ewing | 33—46 |

HERMAN KARL SAALBACH, *Primary Examiner.*

E. LIEBERMAN, *Assistant Examiner.*